(12) United States Patent
Takechi

(10) Patent No.: US 8,840,053 B2
(45) Date of Patent: Sep. 23, 2014

(54) HANDLE ASSEMBLY FOR DUAL-BEARING REEL AND DUAL-BEARING REEL

(71) Applicant: Shimano, Inc., Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 43 days.

(21) Appl. No.: 13/632,774

(22) Filed: Oct. 1, 2012

(65) Prior Publication Data
US 2013/0126652 A1    May 23, 2013

(30) Foreign Application Priority Data
Nov. 18, 2011   (JP) .................................. 2011-252730

(51) Int. Cl.
A01K 89/01      (2006.01)
A01K 89/00      (2006.01)
A01K 89/015     (2006.01)

(52) U.S. Cl.
CPC ............ *A01K 89/006* (2013.01); *A01K 89/015* (2013.01)
USPC .............................. 242/283; 242/282; 74/545

(58) Field of Classification Search
USPC .............................. 242/282–284, 317; 74/545
See application file for complete search history.

(56) References Cited

U.S. PATENT DOCUMENTS

| | | | | |
|---|---|---|---|---|
| 847,890 A * | 3/1907 | Blackburn | .................... | 242/267 |
| 1,890,736 A | 12/1932 | Lenz | | |
| 2,648,506 A | 8/1953 | Kirby | | |
| 3,375,993 A * | 4/1968 | Hayes | ............................ | 242/284 |
| D255,823 S * | 7/1980 | Deguchi et al. | .............. | D22/141 |
| 4,732,348 A * | 3/1988 | Young | ............................ | 242/258 |
| 5,538,198 A * | 7/1996 | Hirano et al. | .................. | 242/283 |
| 6,029,922 A * | 2/2000 | Kim et al. | ...................... | 242/283 |
| 6,666,396 B2 * | 12/2003 | Landwerlen | ................... | 242/283 |
| 6,988,684 B2 * | 1/2006 | Hirayama et al. | ............ | 242/283 |
| 7,191,969 B2 * | 3/2007 | Miyazaki et al. | .............. | 242/283 |
| 2002/0185562 A1 * | 12/2002 | Landwerlen | ................... | 242/283 |
| 2003/0205637 A1 * | 11/2003 | Nakajima et al. | ............. | 242/283 |
| 2003/0218088 A1 * | 11/2003 | Hirayama et al. | ............ | 242/283 |
| 2010/0243781 A1 * | 9/2010 | Hayashi | ........................ | 242/224 |

FOREIGN PATENT DOCUMENTS

| | | |
|---|---|---|
| JP | 62-119772 U | 7/1987 |
| JP | 3967661 B2 | 6/2007 |
| JP | 2007-174987 A | 7/2007 |

OTHER PUBLICATIONS

Extended European Search Report of the corresponding European Application No. 12188818.4, dated Mar. 1, 2013.

* cited by examiner

*Primary Examiner* — Emmanuel M Marcelo
(74) *Attorney, Agent, or Firm* — Global IP Counselors

(57) ABSTRACT

A dual-bearing reel attachable to a fishing rod, comprising, a reel unit, a handle shaft rotatably supported by the reel unit, and a handle assembly being mounted onto the handle shaft. The handle assembly includes a handle arm and a handle knob rotatably attached to a tip of the first arm portion. The handle arm includes an attachment portion detachably attached onto the handle shaft in a unitarily rotatable state, a first arm portion extending radially outwards from the attachment portion, first and second protruding portions disposed around of the attachment portion, and a coupling portion. The first and second protruding portions are protruding radially outwards. The first and second protruding portions are circumferentially aligned at predetermined intervals. The coupling portion couple the protruding portions.

11 Claims, 11 Drawing Sheets

HANDLE ASSEMBLY FOR DUAL-BEARING REEL AND DUAL-BEARING REEL

CROSS-REFERENCE TO RELATED APPLICATIONS

This application claims priority to Japanese Patent Application No. 2011-252730 filed on Nov. 18, 2011. The entirety disclosure of Japanese Patent Application No. 2011-252730 is hereby incorporated herein by reference.

BACKGROUND

1. Field of the Invention

The present invention relates to a handle assembly for a dual-bearing reel, which can be mounted to a handle shaft rotatably supported by a reel unit for a dual-bearing reel attachable to a fishing rod. The present invention also relates to a dual-bearing reel including the handle assembly 2. Background Art Dual-bearing reels are normally embedded with a handle assembly for rotating a spool in a fishing-line winding direction. The handle assembly is mounted to a handle shaft rotatably supported by a reel unit. The handle assembly is normally used for continuously rotating the spool in the fishing-line winding direction to wind a fishing line onto the spool. However, an operation of slightly winding the fishing line is required in fishing. For example, the spool can be slightly rotated in the fishing-line winding direction, for instance, when slack is decreased in the fishing line by winding the fishing line, when a clutch mechanism is returned to a clutch-on state from a clutch-off state after casting, when a lure is caused to perform an action after casting and etc.

In slightly rotating the spool in the fishing-line winding direction, the fishing-line winding action can not be instantly performed when the fishing line is wound using a handle assembly. Specifically, it is even difficult to instantly operate a handle assembly of a double handle type unless handle knobs happen to be positioned for allowing an angler to easily pinch them. This is because the handle knobs are disposed away from each other at an angle of 180 degrees. In view of the above, a structure has been widely known that a drag regulation member called "a star drag" is provided with auxiliary operating portions for rotating a handle shaft by a hand holding a fishing rod (see e.g., specification of Japan Patent No. 3967661). In the well-known drag regulation member, the auxiliary operating portions are disposed on the tips of a plurality of drag operating portions radially protruded. The auxiliary operating portions are disposed closer to the reel unit.

SUMMARY

In the well-known structure, the handle shaft is rotated in the fishing-line winding direction using the drag regulation member. Therefore, only the drag regulation member can be rotated without rotation of the handle shaft, depending on extent of drag force regulation by the drag regulation member (e.g., when drag force is weakened). Therefore, the handle shaft cannot be reliably rotated in the fishing-line winding direction by a hand opposite to the hand holding the handle assembly.

It is an advantage of the present invention to instantly and reliably rotate a handle shaft in the fishing-line winding direction by a hand opposite to the hand operating a handle assembly.

A dual-bearing reel attachable to a fishing rod, comprising, a reel unit, a handle shaft rotatably supported by the reel unit, and a handle assembly being mounted onto the handle shaft. The handle assembly includes a handle arm and a handle knob rotatably attached to a tip of the first arm portion. The handle arm includes an attachment portion detachably attached onto the handle shaft in a unitarily rotatable state, a first arm portion extending radially outwards from the attachment portion, first and second protruding portions disposed around of the attachment portion, and a coupling portion. The first and second protruding portions are protruding radially outwards. The first and second protruding portions are circumferentially aligned at predetermined intervals. The coupling portion couple the protruding portions.

BRIEF DESCRIPTION OF THE DRAWINGS

Referring now to the attached drawings which form a part of this original disclosure.

DETAILED DESCRIPTION OF THE PREFERRED EMBODIMENTS

First Exemplary Embodiment
Structure of Dual-bearing Reel

Figure 1:
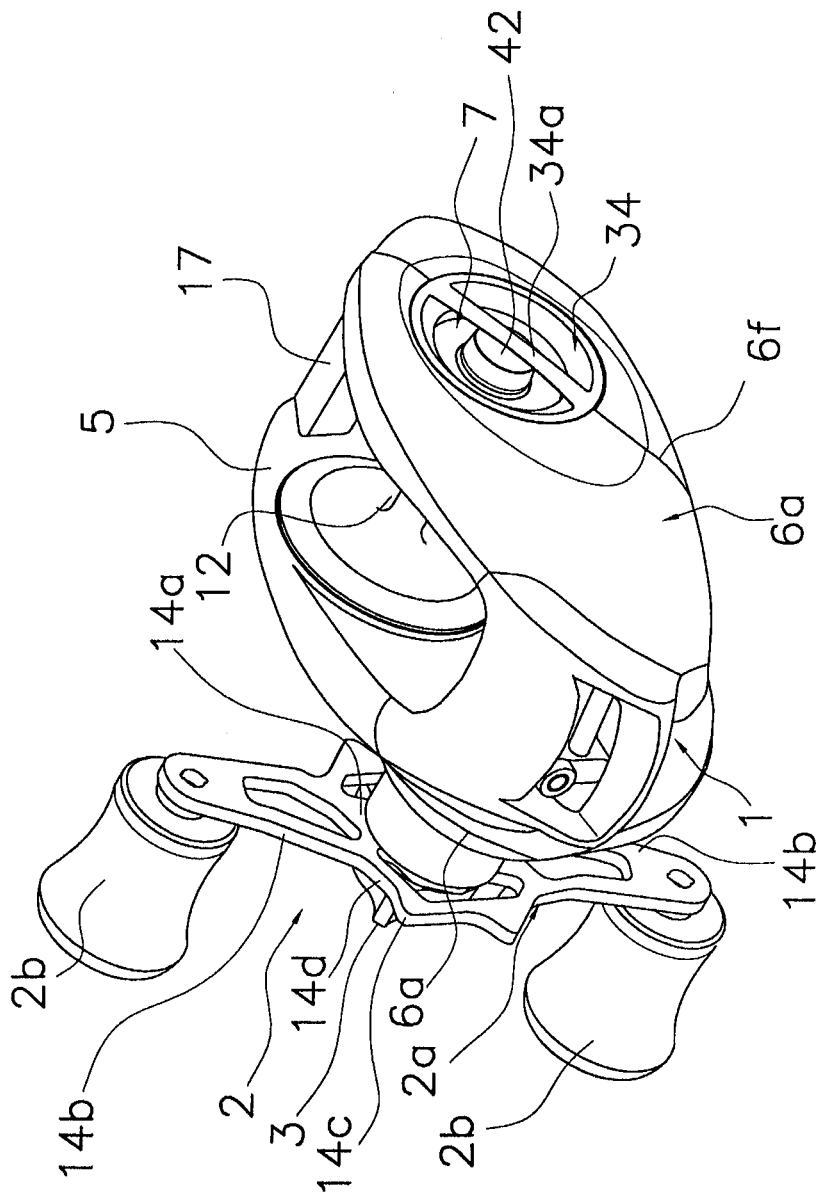
FIG. 1 is a perspective view of a dual-bearing reel employing an exemplary embodiment of the present invention.

In FIG. 1, a dual-bearing reel according to a first exemplary embodiment of the present invention is a low profile reel. The dual-bearing reel includes a reel unit 1, a handle assembly 2 for rotating a spool and a spool 12 for winding a fishing line. The handle assembly 2 is disposed laterally to (e.g., on the left side of) the reel unit 1. The spool 12 is rotatably and detachably attached to the inside of the reel unit 1. Further, a drag regulation member 3 for regulating drag is disposed on the opposite side of the reel unit 1 through the handle assembly 2.

Structure of Handle Assembly

Figure 2:
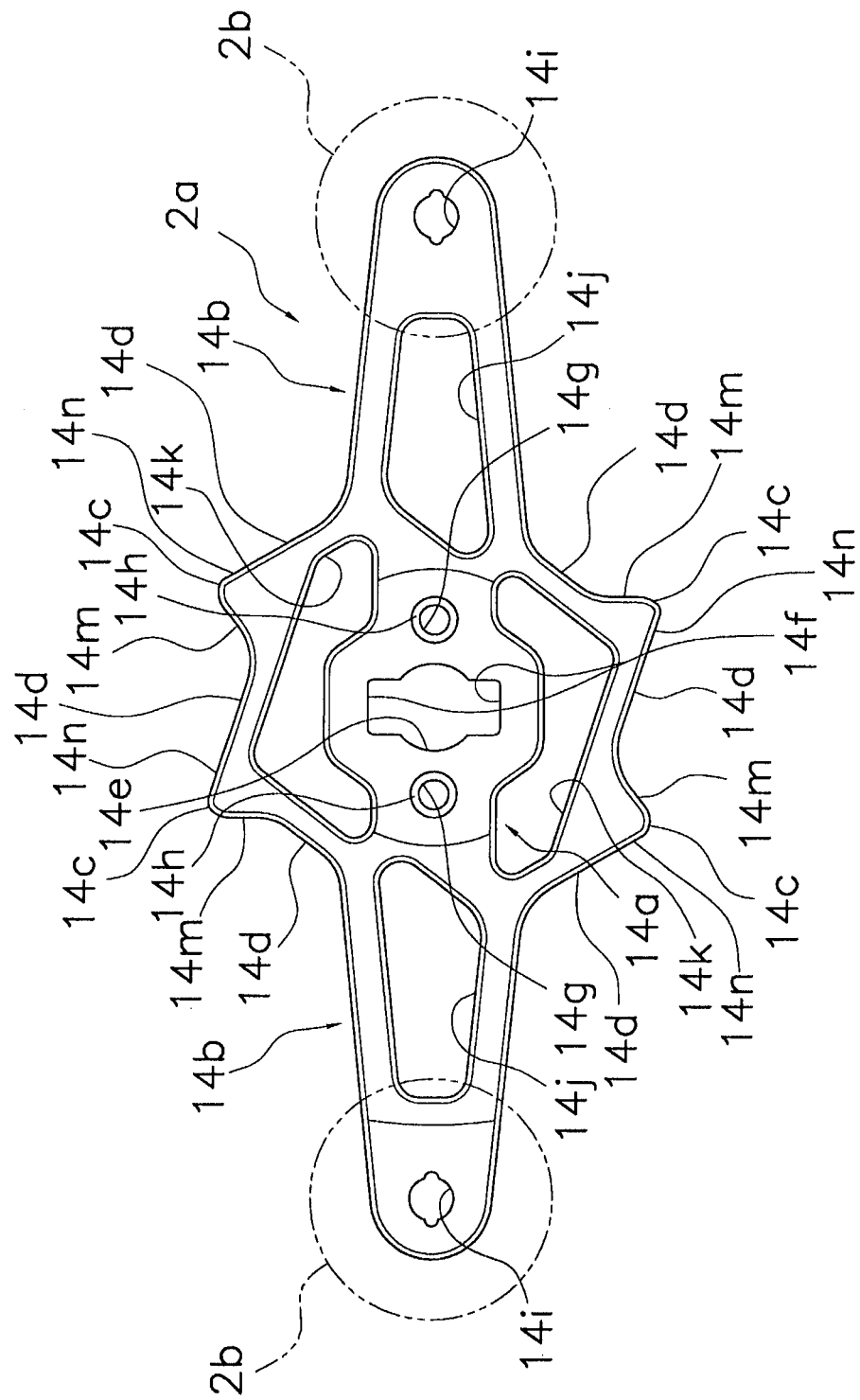
FIG. 2 is a front view of a handle arm.
Figure 3:
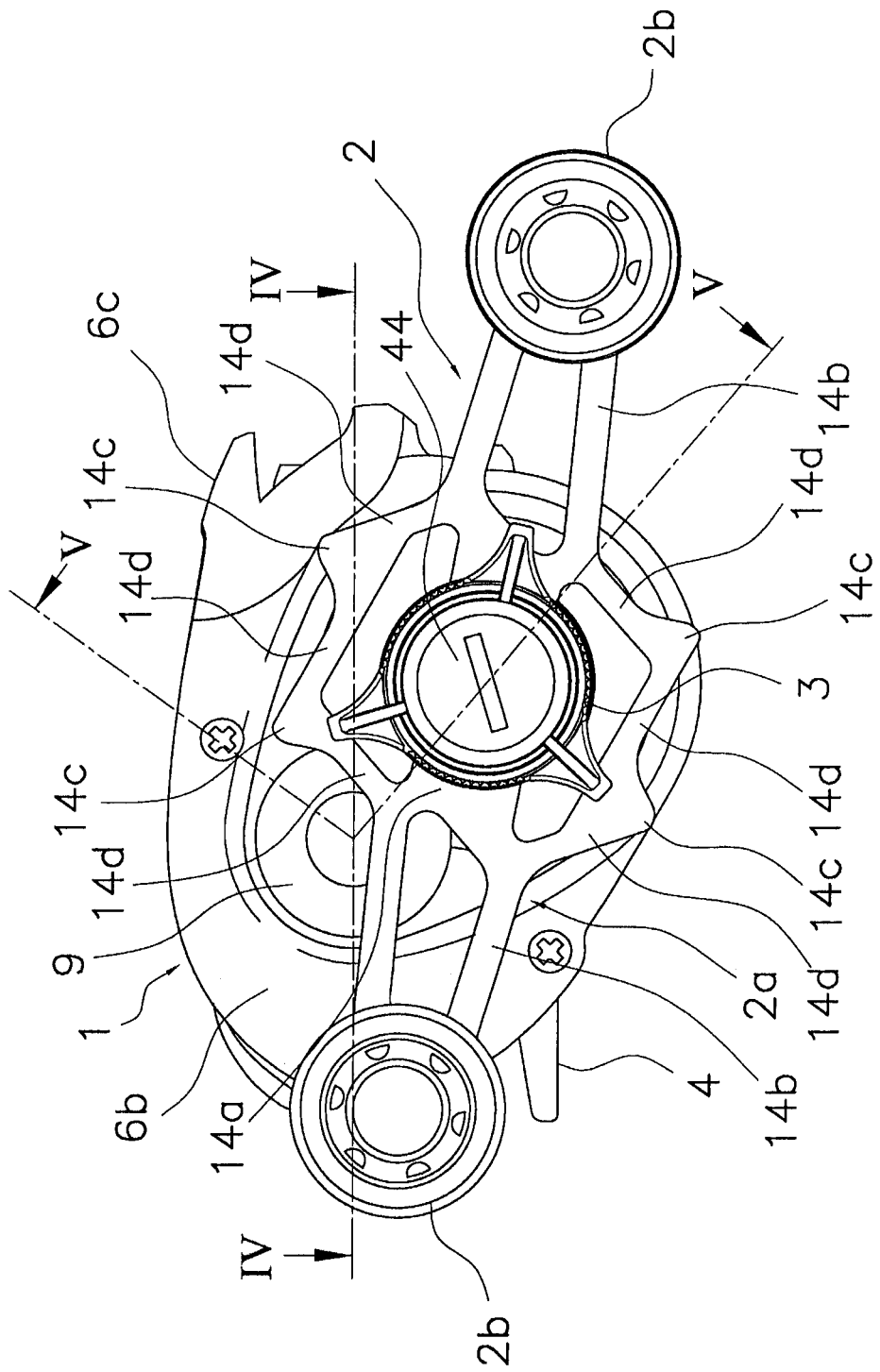
FIG. 3 is a side view of a handle attachment side of the dual-bearing reel.
Figure 4:
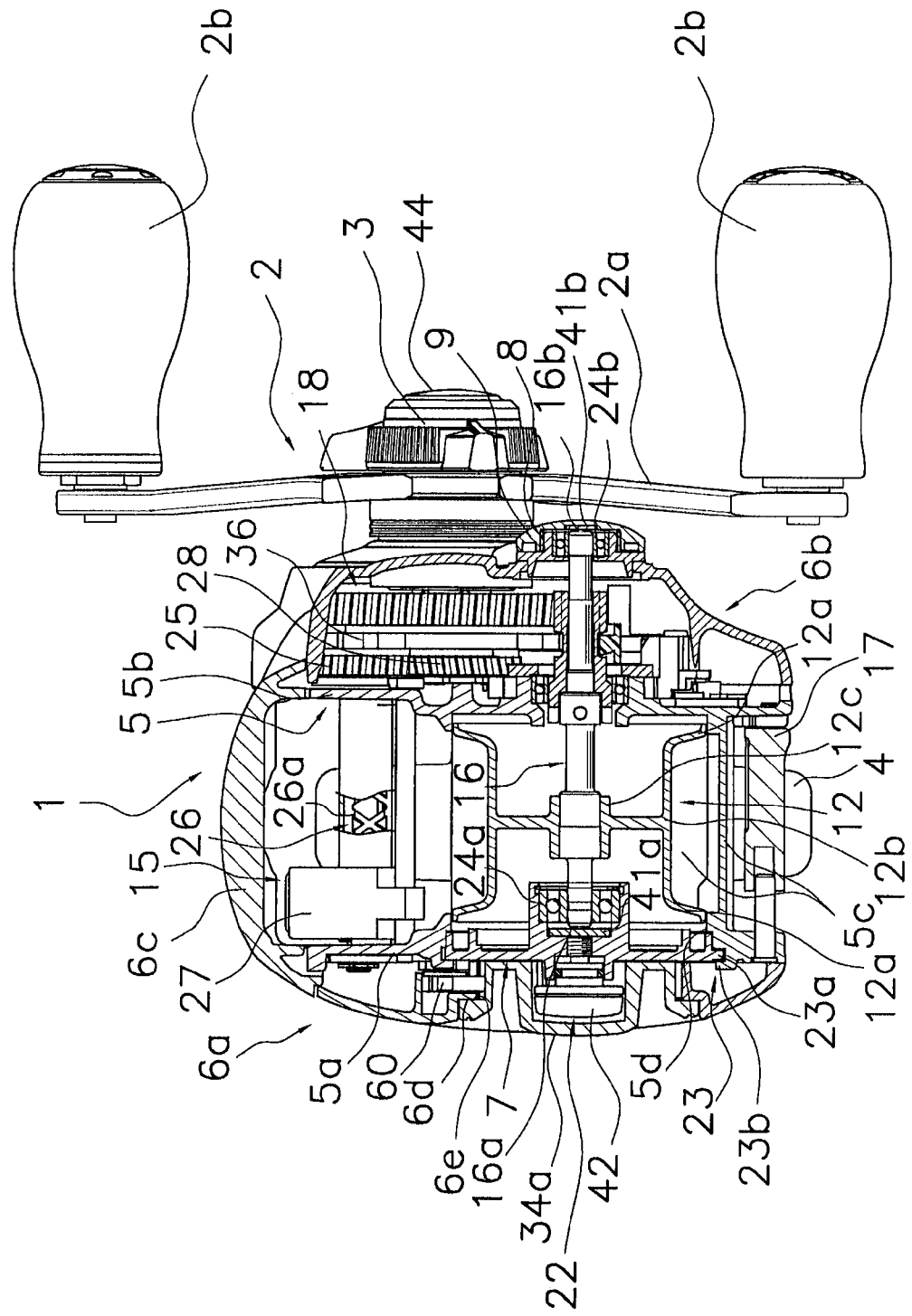
FIG. 4 is a cross-sectional view of FIG. 3 sectioned along a cutting line IV-IV.

The handle assembly 2 is of a double-handle type including a handle arm 2a and two handle knobs 2b. The handle arm 2a is a plate-shaped member made of, for instance, metal. The handle knobs 2b are rotatably attached to the both ends of the handle arm 2a. As illustrated in FIGS. 1, 2 and 3, the handle arm 2a has an attachment portion 14a, two arm portions 14b, a plurality of (e.g., four) protruding portions 14c, and a plurality of (e.g., six) coupling portions 14d. As illustrated in FIG. 4, the handle arm 2a is slightly curved in the longitudinal direction while the both ends thereof are positioned closer to the reel unit 1 than the attachment portion 14a is.

The attachment portion 14a can be attached to a handle shaft 30 to be described while being positioned closer to the reel unit 1 than the drag regulation member 3 is. The attachment portion 14a is positioned in the longitudinal center of the handle arm 2a. The attachment portion 14a has a through hole 14e, a pair of first engaging recesses 14f, and a pair of screw insertion holes 14g. The through hole 14e is a round hole formed in the longitudinal center of the handle arm 2a for allowing the handle shaft 30 to be described to pass threthrough. The first engaging recesses 14f are recessed radially outwards from the inner peripheral surface of the through hole 14e in a direction perpendicular to the longitudinal direction of the handle arm 2a. The screw insertion holes 14g are formed in the handle arm 2a while interposing the through hole 14e therebetween in the longitudinal direction. Further, the handle arm 2a has a pair of head portion accommodating portions 14h in the corresponding positions to the screw insertion holes 14g. Specifically, each head portion accommodating portion 14h is recessed in a cone shape on the front surface of the handle arm 2a for accommodating a head portion 48a (see FIG. 7) of each attachment bolt 48 to be described.

The two arm portions 14b extend respectively from the attachment portion 14a while being tapered radially outwards. Each of the arm portions 14b has an attachment hole 14i on the tip thereof for attaching each handle knob 2b thereto. Each of the arm portions 14b has a first opening 14j for reducing the weight of the handle arm 2a.

The plural protruding portions 14c are disposed in the surrounding of the attachment portion 14a. The protruding portions 14c extend radially outwards while being circumferentially aligned at predetermined intervals. To reduce the weight of the handle arm 2a, two second openings 14k are formed between the attachment portion 14a and both of the protruding portions 14c and the coupling portions 14d. Accordingly, two spaces are formed between the attachment portion 14a and both of the protruding portions 14c and the coupling portions 14d. As illustrated in FIG. 3, the protruding portions 14c can protrude radially outwards from the fishing-rod attachment side of the reel unit 1.

As illustrated in FIGS. 1, 2 and 3, the plural coupling portions 14d couple the plural protruding portions 14c. In the first exemplary embodiment, the coupling portions 14d couple the arm portions 14b and the protruding portions 14c. The protruding portions 14c are coupled by the coupling portions 14d for forming a saw-tooth shape. In other words, the protruding portions 14c of one pair and the coupling portions 14d are formed in a saw-tooth shape. It should be noted that the arm portions 14b and portions 14m of the protruding portions 14c (i.e., steep slopes in the saw teeth) are used in rotating the handle shaft 30 in the fishing-line winding direction with a hand opposite to the hand operating the handle assembly 2. Therefore, long operating length can be obtained in the radial direction when the handle shaft 30 is rotated in the fishing-line winding direction with any one of the six portions including the four protruding portions 14c and the two arm portions 14b. A rotational operation can be thereby easily performed in the fishing-line winding direction. Further, no step is formed in the radial direction between each protruding portion 14c and each of portions 14n (i.e., gentle slopes in the saw teeth) and between each coupling portion 14d and each of the portions 14n. Therefore, the structure does not prevent an action of switching the position of a finger from one protruding portion 14c to another protruding portion 14c in operating the handle assembly 2.

Structure of Reel Unit

As illustrated in FIGS. 3, 4, 5 and 6, the reel unit 1 includes a frame 5, a first cover 6a, a second cover 6b, a shaft support part 7, and a front cover 6c. The first and second covers 6a and 6b are attached to the both lateral sides of the frame 5 for laterally covering the frame 5. The shaft support part 7 is detachably attached to a lateral part of the frame 5. The front cover 6c covers the front side of the frame 5. The first cover 6a is disposed on the opposite side of the handle assembly 2, whereas the second cover 6b is disposed on the attachment side of the handle assembly 2.

The frame 5 is a member made of light metal (e.g., aluminum alloy, magnesium alloy, etc.) and includes a first side plate 5a, a second side plate 5b, and a plurality of coupling portions 5c. The first and second side plates 5a and 5b are opposed at a predetermined interval. The coupling portions 5c couple the first and second side plates 5a and 5b. The shaft support part 7 is detachably attached to the first side plate 5a disposed on the opposite side of the handle attachment side. The first side plate 5a has a circular opening 5d for allowing the spool 12 to pass therethrough. The shaft support part 7 is detachably attached to the opening 5d by, for instance, a bayonet mechanism 23 in order to take out the spool 12 from the opening 5d side. Further, a fishing rod attachment portion 4 is integrally formed with two bottom-side coupling portions 5c. The fishing rod attachment portion 4 is a member elongated back and forth for attaching the reel to a fishing rod.

The first cover 6a is a member made of light metal (e.g., aluminum alloy, magnesium alloy, etc.) and covers the outside of the first side plate 5a. The first cover 6a is bulged axially outwards in a convex shape and is thus formed in a three-dimensionally curved surface. The first cover 6a has a circular recess 6d and an opening 6e in the center part thereof Further, the first cover 6a has a stepped portion 6f linearly extending on the outer surface thereof (see FIGS. 5 and 6). The opening 6e has a circular shape, for instance, and is formed in the center part of the recess 6d. The shaft support part 7 is rotatably attached to the first cover 6a. The first cover 6a is detachably attached to the frame 5 together with the shaft support part 7. A positioning mechanism 60 (see FIG. 4) is disposed on the inner peripheral part of the opening 6e of the first cover 6a while being disposed in the surrounding of the shaft support part 7. The positioning mechanism 60 is configured to prevent rotation of the shaft support part 7 of a non-operated state and appropriately position the shaft support part 7 of an operated state. As illustrated in FIG. 6, the stepped portion 6f is formed for slanting obliquely upwards from the front lower side of the reel unit 1. The stepped portion 6f is formed for further outwardly protruding the upper part of the first cover 6a than the lower part thereof. The stepped portion 6f is formed in association with the position of a knob portion 34a to be described of the shaft support part 7.

The second cover 6b is a member made of light metal (e.g., aluminum alloy, magnesium alloy, etc.) and is fixed to the second side plate 5b of the frame 5 by screws. The second cover 6b includes a boss portion 8 and a lid member 9. The boss portion 8 is swaged to a position where a spool shaft 16 is disposed. The lid member 9 is screwed onto the boss portion 8 for closing an opening of the boss portion 8. The boss portion 8 is fixed to the second cover 6b by, for instance, swaging. The lid member 9 is screwed and fixed to the boss portion 8.

The shaft support part 7 is rotatably supported by the first cover 6a while interposing and holding the first cover 6a between components thereof. Therefore, the shaft support part 7 is prevented from being detached from the first cover 6a. Further, the shaft support part 7 is detachably attached to the first side plate 5a by the bayonet mechanism 23 as illustrated in FIG. 4. The bayonet mechanism 23 includes a plurality of (e.g., three) plate-shaped bayonet protrusions 23a and a plurality of (e.g., three) bayonet grooved portions 23b. The bayonet protrusions 23a protrude radially outwards from the outer periphery of the shaft support part 7 while being circumferentially aligned at predetermined intervals on the outer periphery of the shaft support part 7. The bayonet grooved portions 23b are formed on a surface radially outwards of the opening 5d of the first side plate 5a for engaging with the bayonet protrusions 23a. The shall support part 7 is rotated and attached to the first side plate 5a by the bayonet mechanism 23. Accordingly, the first cover 6a is also attached to the first side plate 5a.

Figure 5:
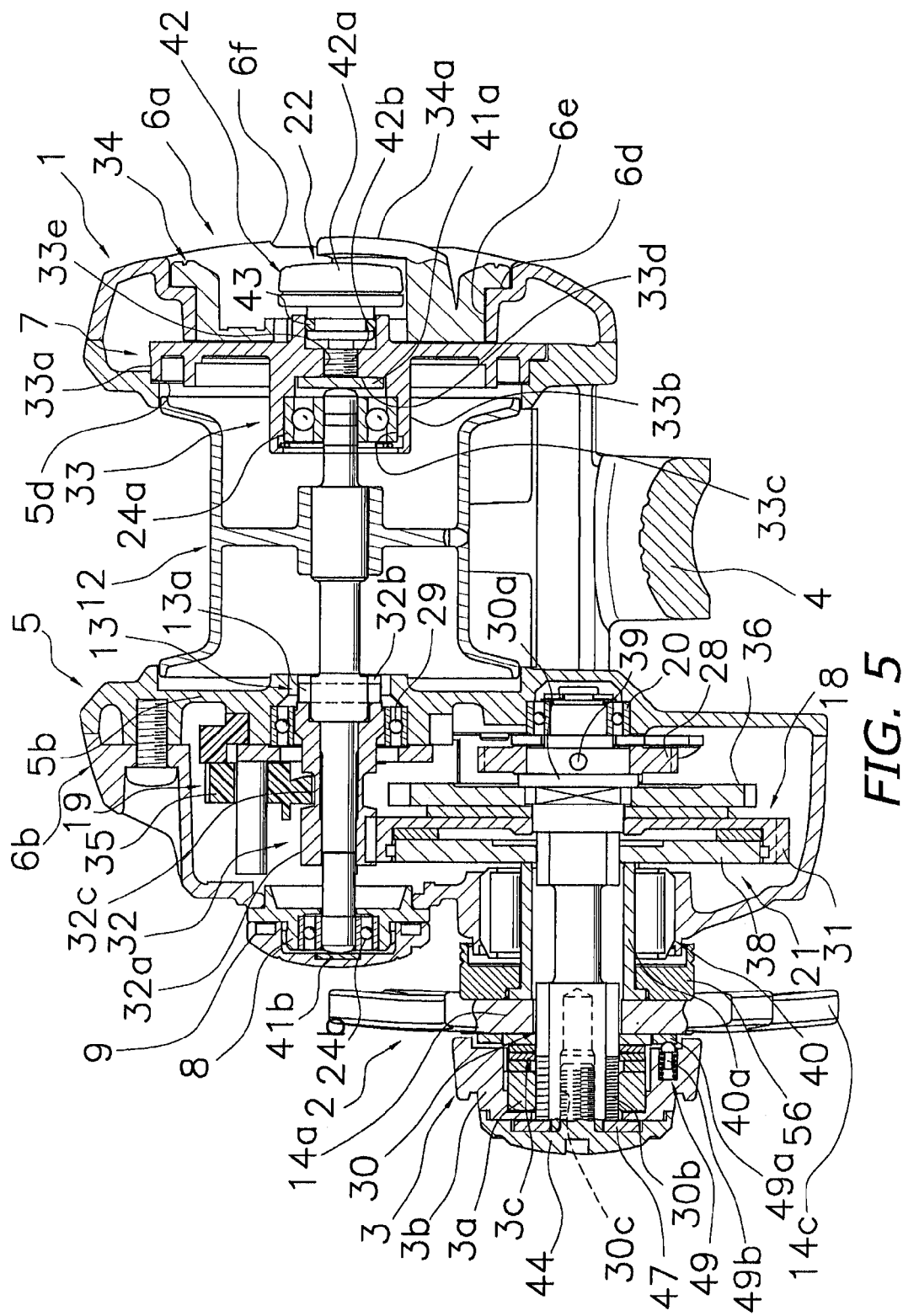
FIG. 5 is a cross-sectional view of FIG. 3 sectioned along a cutting line V-V.
Figure 6:
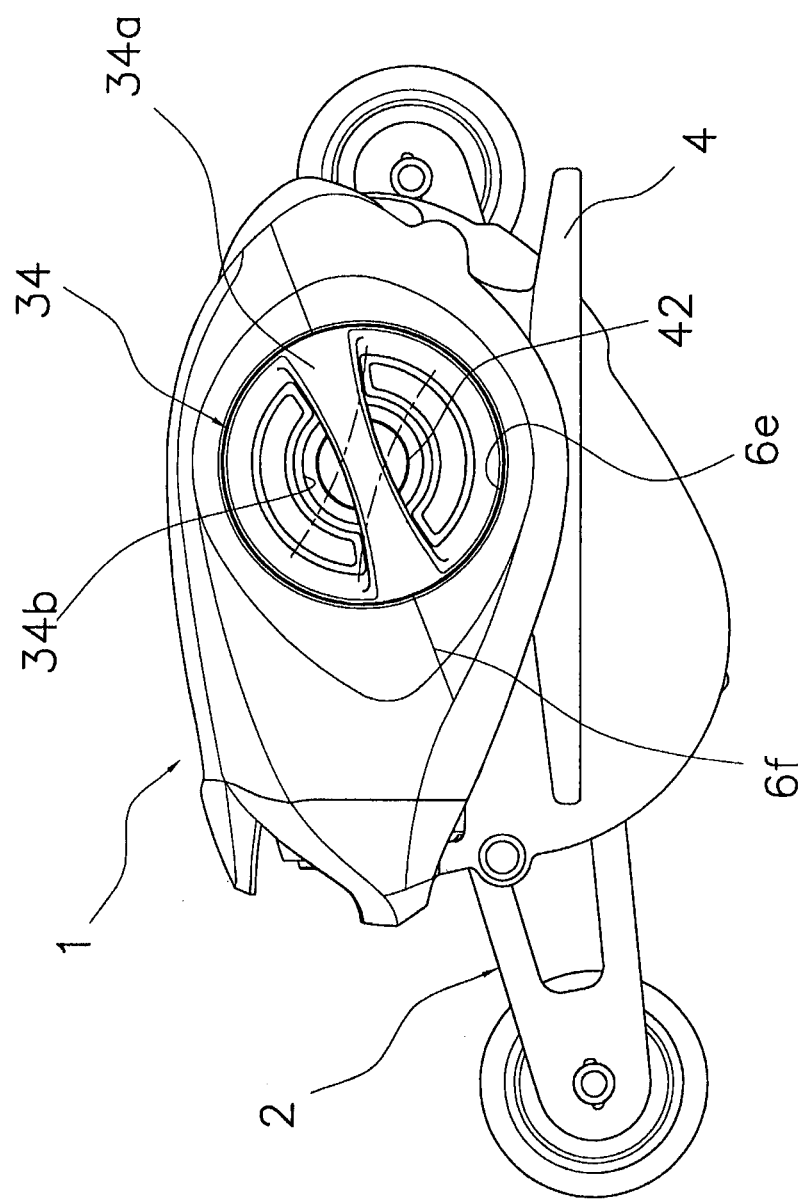
FIG. 6 is a side view of the dual-bearing reel viewed from a side opposite to the handle attachment side.

As illustrated in FIG. 5, the shaft support part 7 includes a bearing mounting portion 33 and an attachment/detachment operating portion 34. The bearing mounting portion 33 is a portion where a first bearing 24a is mounted. The attachment/detachment operating portion 34, together with the bearing mounting portion 33, interposes and holds the first cover 6a therebetween in a relatively rotatable state. The bearing mounting portion 33 is a saucer-shaped member. An outer periphery 33a of the bearing mounting portion 33 is fitted into the opening 5d. Further, the outer periphery 33a has the aforementioned plural bayonet protrusions 23a of the bayonet mechanism 23. The bayonet protrusions 23a protrude radially outwards from the outer periphery 33a while being circumferentially aligned about the axis of the spool 12 at predetermined intervals. The bearing mounting portion 33 has a tubular bearing accommodation portion 33b in the center part thereof The bearing accommodation portion 33b protrudes towards the spool 12 in a tubular shape for accommodating the first bearing 24a. The bearing accommodation portion 33b has a stepped tubular mounting space 33c for mounting the first bearing 24a to the inner peripheral surface thereof. A disc-shaped first plate 41a forming a part of a casting control mechanism 22, which will be described hereinafter, is attached to a bottom portion 33d of the mounting space 33c. The bottom portion 33d has a female threaded portion 33e that a brake knob 42 to be described of the casting control mechanism 22 is screwed. The attachment/detachment operating portion 34 is unitarily rotatable with the bearing mounting portion 33 with respect to the first cover 6a while being appropriately positioned by the bearing mounting portion 33.

The attachment/detachment operating portion 34 is a stepped cylindrical member fixed to the bearing mounting portion 33 by a screw member (not illustrated in the figures). The attachment/detachment operating portion 34 serves to perform an attachment/detachment operation of the first cover 6a with respect to the frame 5. The outer surface of the attachment/detachment operating portion 34 is slightly recessed than that of the first cover 6a. As illustrated in FIG. 6, the attachment/detachment operating portion 34 has the knob portion 34a for performing an attachment/detachment operation. The knob portion 34a is disposed on the diameter of the attachment/detachment operating portion 34a while being disposed astride the brake knob 42. The knob portion 34a is disposed axially outwards the brake knob 42. The knob portion 34a is slightly curved in a convex shape while being formed along the three-dimensionally curved surface of the first cover 6a. The knob portion 34a can be operated and rotated to an attachment position depicted with a solid line in FIG. 6 and a detachment position depicted with a dashed two-dotted line in FIG. 6. In the attachment position, the first cover 6a is attached to the frame 5. In the detachment position, the first cover 6a is detached from the frame 5. When rotated to the attachment position, the knob portion 34a is configured to be disposed along the stepped portion 6f of the first cover 6a. Further, the attachment/detachment operating portion 34 has an opening 34b for exposing the brake knob 42 to the outside.

The knob portion 34a is formed astride the brake knob 42. The brake knob 42 can be thereby prevented from coming off.
Structure of Other Elements in Dual-Bearing Reel As illustrated in FIG. 4, the frame 5 accommodates the spool 12 for winding a fishing line, a level winding mechanism 15 and a clutch operating member 17. The spool 12 can be disposed along a direction perpendicularly to a fishing rod. The level winding mechanism 15 is configured to uniformly wind the fishing line onto the spool 12. The clutch operating member 17 functions as a thumb pad in thumbing the fishing line. Further, as illustrated in FIG. 5, a gear mechanism 18, a clutch mechanism 13, a clutch control mechanism 19, a drag mechanism 21, and the casting control mechanism 22 are disposed between the frame 5 and the second cover 6b. The gear mechanism 18 is configured to transfer rotational force from the handle assembly 2 to the spool 12 and the level winding mechanism 15. The clutch control mechanism 19 is configured to execute an on/off control of the clutch mechanism 13. The drag mechanism 21 is configured to brake rotation of the spool 12 in a fishing-line releasing direction. The casting control mechanism 22 is configured to regulate resistive force to be applied during rotation of the spool 12.

As illustrated in FIG. 4, the spool 12 has a pair of saucer-shaped flanges 12a on the both lateral parts thereof. Further, the spool 12 has a tubular bobbin trunk 12b between the flanges 12a. Yet further, the spool 12 has a tubular boss 12c integrally formed with a substantially axial center part of the inner periphery of the bobbin trunk 12b. The spool 12 is non-rotatably fixed onto the spool shaft 16 penetrating the boss 12c by, for instance, serration coupling. The method of fixing the spool 12 onto the spool shaft 16 is not limited to the serration coupling and a variety of coupling methods (e.g., key coupling, spline coupling, etc.) can be herein employed instead.

The spool shaft 16 extends to the second cover 6b while penetrating through the second side plate 5b. The spool shaft 16 is rotatably supported by the reel unit 1 through the first bearing 24a and a second bearing 24b. The first bearing 24a is mounted to the shaft support part 7, while the second bearing 24b is mounted to the boss portion 8 fixed to the second side plate 5b. A first end 16a and a second end 16b of the spool shaft 16 protrude respectively and formed in either a chevron shape or a circular-arc shape. The first and second ends 16a and 16b of the spool shaft 16 can make contact with the casting control mechanism 22.

As illustrated in FIG. 5, an engaging pin 13a forming a part of the clutch mechanism 13 is fixed to a part of the spool shaft 16 that penetrates through the second side plate 5b. The engaging pin 13a penetrates through the spool shaft 16 along its diameter, while the both ends thereof protrude radially from the spool shaft 16. The tip (i.e., the right end in FIG. 5) of a pinion gear 32 to be described can be engaged with the both protruding ends of the engaging pin 13a.

As illustrated in FIG. 4, the level winding mechanism 15 includes a second gear 25, a traverse cam shaft 26, and a fishing line guide 27. The second gear 25 is meshed with a first gear 28 of the gear mechanism 18 to be described. The traverse cam shaft 26 is a shaft member having helical grooves 26a intersecting with each other on the outer peripheral surface thereof. The fishing line guide 27 is engaged with the helical grooves 26a. The fishing line guide 27 is configured to reciprocate in parallel to and in front of the spool 12 in conjunction with rotation of the traverse cam shaft 26.

As illustrated in FIG. 5, the gear mechanism 18 includes the handle shaft 30, a driving gear 31, the pinion gear 32 and the first gear 28. The driving gear 31 is rotatably mounted onto the handle shaft 30. The pinion gear 32 is a tubular gear to be meshed with the driving gear 31. The first gear 28 is meshed with the second gear 25 while being mounted onto the handle shaft 30. The handle shaft 30 is prevented from rotating in the fishing-line releasing direction by a roller-type one-way clutch 40. In other words, the handle shaft 30 is allowed to rotate only in the fishing-line winding direction. The one-way clutch 40 is mounted to the second cover 6b.

Figure 7:
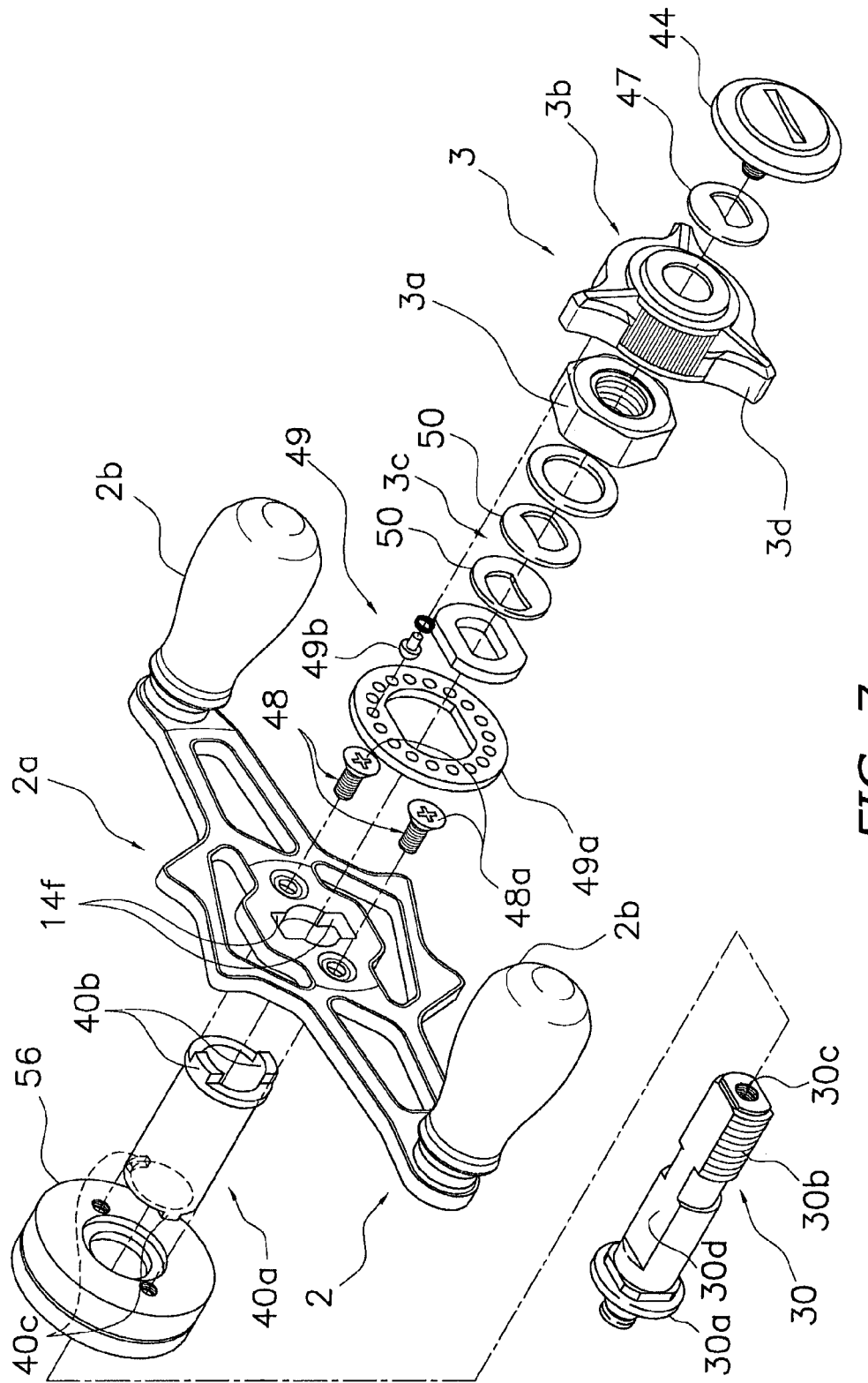
FIG. 7 is an exploded perspective view of a reel unit side of a drag mechanism.

The base end of the handle shaft 30 is rotatably supported by the second side plate 5b through a bearing 20. A ratchet wheel 36 is disposed on the rear side (i.e., the right side in FIG. 5) of the driving gear 31 while being mounted onto the handle shaft 30 in a unitarily rotatable state. The first gear 28 is disposed on the rear side of the ratchet wheel 36. As illustrated in FIG. 7, the handle shaft 30 has a large-diameter contact portion 30a between its portion for mounting the ratchet wheel 36 and its portion for mounting the first gear 28. The handle shaft 30 has a male threaded portion 30b on the outer peripheral surface of the tip thereof. The handle shaft 30 has a female threaded portion 30c on the tip surface thereof. The handle shaft 30 has a rotation coupling portion 30d on the outer peripheral surface thereof. The rotation coupling portion 30d is formed by a pair of parallel opposed surfaces for coupling an inner race 40a of the one-way clutch 40 and a pressure plate 38 to be described in a unitarily rotatable state. Further, the intermediate part of the handle shaft 30 is recessed for weight reduction.

As illustrated in FIG. 5, rotation of the handle shaft 30 is transferred to the driving gear 31 through the inner ring 40 of the one-way clutch 40 and the drag mechanism 21.

As illustrated in FIG. 4, the pinion gear 32 extend axially outwards from the second side plate 5b. The pinion gear 32 is a tubular member that the spool shaft 16 penetrates through the center thereof. The pinion gear 32 is mounted onto the spool shaft 16 while being axially movable. The pinion gear 32 has the gear portion 32a, an engaging portion 32b and a narrowed portion 32c. The gear portion 32a is formed on the base end of the pinion gear 32. The engaging portion 32b is formed on the tip end of the pinion gear 32 and can be engaged with the engaging pin 13a. The narrowed portion 32c is disposed between the gear portion 32a and the engaging portion 32b. The driving gear 31 is meshed with the gear portion 32a. The engaging pin 13a is engaged with the engaging portion 32b. A clutch yoke 35 of the clutch control mechanism 19 is engaged with the narrowed portion 32c. The pinion gear 32 is configured to be moved between a clutch-on position and a clutch-off position (located leftwards of the clutch-on position in FIG. 5) in conjunction with either an operation of the clutch operating member 17 or rotation of the handle assembly 2 in the fishing-line winding direction. The pinion gear 32 is supported by the second side plate 5b through a bearing 29 while being rotatable and axially movable.

As illustrated in FIG. 5, the first gear 28 is coupled to the handle shaft 30 through a torque limiter 39. As illustrated in FIG. 4, the first gear 28 is meshed with the second gear 25 mounted onto the traverse cam shaft 26 of the level winding mechanism 15. The torque limiter 39 is provided for preventing rotation of the handle shaft 30 from being transmitted to the first gear 28 when torque of a predetermined level or greater acts. The torque limiter 39 includes at least a pin member (not illustrated in the figures), an urging member, and at least a recess. The pin member is disposed in the handle shaft 30 while being protrudable/retractable therefrom/thereto. The urging member urges the pin member radially outwards. The recess is formed on the inner peripheral surface of the first gear 28 for engaging with the pin member.

The clutch mechanism 13 includes the engaging pin 13a and the engaging portion 32b of the pinion gear 32. The clutch mechanism 13 can be set to be in either of the clutch-on state and the clutch-off state in response to an operation of the clutch operating member 17. In the clutch-on state, rotation of the handle assembly 2 is transmitted to the spool 12. In the clutch-off state, the spool 12 can be freely rotated.

As illustrated in FIGS. 1 and 4, the clutch operating member 17 is disposed rearwards of the spool 12 while being disposed in the rear part of the space interposed between the first side plate 5a and the second side plate 5b. The frame 5 has an elongated hole (not illustrated in the figures) in each of the first and second side plates 5a and 5b. The clutch operating member 17 is rotatably supported by the elongated holes. Therefore, the clutch operating member 17 can be slid up and down along the elongated holes.

The clutch control mechanism 19 includes the clutch yoke 35. The clutch yoke 35 is disposed on the outer peripheral side of the spool shaft 16. The clutch yoke 35 is supported by two pins (not illustrated in the figures) while being movable in parallel to the axis of the spool shaft 16. It should be noted that the spool shaft 16 can be rotated relatively to the clutch yoke 35. In other words, the clutch yoke 35 is configured not to be rotated even when the spool shaft 16 is rotated. Further, the clutch yoke 35 is movable right and left in FIG. 5 while the middle part thereof is engaged with the narrowed portion 32c of the pinion gear 32. The clutch yoke 35 is constantly urged in a clutch-on direction (i.e., inwards, more specifically, rightwards in FIG. 5) by a spring (not illustrated in the figures).

In the structure as described above, the pinion gear 32 is normally disposed in the inner clutch-on position while being engaged with the engaging pin 13a of the spool shaft 16. Thus, the clutch-on state is produced. When the pinion gear 32 is moved outwards by the clutch yoke 35, on the other hand, engagement between the pinion gear 32 and the engaging pin 13a is released. Thus, the clutch-off state is produced.

As illustrated in FIGS. 5 and 7, the drag mechanism 21 includes the drag regulation member 3, the pressure plate 38, and the one-way clutch 40. The drag regulation member 3 is used for an operation of regulating drag force. The pressure plate 38 is mounted onto the handle shaft 30 in a unitarily rotatable state. The one-way clutch 40 is mounted to the second cover 6b while being disposed in the surrounding of the handle shaft 30. The drag regulation member 3 includes a nut 3a, an operating member 3b for coupling the nut 3a in a unitarily rotatable and axially movable state, and an urging member 3c.

The nut 3a is screwed onto the male threaded portion 30b formed on the tip of the handle shaft 30. As illustrated in FIG. 7, the operating member 3b includes three operating protrusions 3d circumferentially aligned at predetermined intervals. The operating member 3b is disposed for rotating the nut 3a. The operating member 3b is prevented from being detached from the handle shaft 30 by a fixation bolt 44. The handle arm 2a is also prevented from being detached from the handle shaft 30 by the fixation bolt 44 through the operating member 3b. The fixation bolt 44 is screwed into the female threaded portion 30c formed in the tip surface of the handle shaft 30. A spring washer 47 is attached between the fixation bolt 44 and the operating member 3b in order to prevent rotation of the fixation bolt 44.

The urging member 3c is disposed between the handle arm 2a and the nut 3a. Urging force of the urging member 3c is changed by the axial movement of the nut 3a. The urging member 3c includes two disc springs 50, for instance. The urging member 3c is configured to press the pressure plate 38 through the handle arm 2a and the inner race 40a. Drag force is regulated by the urging force of the urging member 3c. The pressure plate 38 is coupled to the handle shaft 30 while being unitarily rotatable therewith. Further, the pressure plate 38 is coupled to the inner race 40a of the one-way clutch 40 while being unitarily rotatable therewith.

The inner race 40a of the one-way clutch 40 is coupled to the first engaging recesses 14f of the handle arm 2a while being unitarily rotatable therewith. The inner race 40a is retained by a restricting member 56 fixed to the handle arm 2a by the two attachment bolts 48. The inner race 40a has first engaging protrusions 40b on one end thereof. The first engaging protrusions 40b are engaged with the first engaging recesses 14f. Accordingly, rotation of the handle arm 2a is transmitted to the inner race 40a. Further, the inner race 40a has second engaging protrusions 40c on the other end thereof. The second engaging protrusions 40c are engaged with the pressure plate 38. Therefore, rotation of the handle assembly 2 is transmitted to the handle shaft 30 through the inner race 40a and the pressure plate 38.

Incidentally, the drag mechanism 21 further includes a drag operation sound producing mechanism 49 configured to produce sound in response to an operation of the drag regulation member 3. The drag operation sound producing mechanism 49 includes a sound producing member 49a and a hitting member 49b. The sound producing member 49a is mounted to the handle shaft 30 while being unitarily rotatable therewith. The hitting member 49b is configured to be urged towards the sound producing member 49a. The hitting member 49b is accommodated in the inside of the operating member 3b while being protrudable to or retractable from the sound producing member 49a.

In the drag mechanism 21 structured as described above, slip is caused between the pressure plate 38 and the driving gear 31 when the pressure plate 38 is pressed towards the driving gear 31 by an operation of rotating the drag regulation member 3. The drag mechanism 21 is thus configured to brake the spool 12. To actuate the drag mechanism 21, the one-way clutch 40 is configured to prevent the handle shaft 30 from rotating in the fishing-line releasing direction.

As illustrated in FIGS. 4 and 5, the casting control mechanism 22 includes the first plate 41a, a second plate 41b, and the brake knob 42. The first and second plates 41a and 41b are disposed for holding and interposing therebetween the both ends of the spool shaft 16. The brake knob 42 serves to regulate force of the first and second plates 41a and 41b for holding and interposing therebetween the spool shaft 16.

As described above, the first plate 41a is disposed on the left side (see FIG. 4) while being mounted to the bottom portion 33d of the mounting space 33c of the bearing mounting portion 33 within the bearing mounting portion 33. The first plate 41a can make contact with the first end 16a of the spool shaft 16. The second plate 41b is mounted to the inside of the lid member 9 of the second cover 6b.

As illustrated in FIG. 5, the brake knob 42 has an operating portion 42a and a male threaded portion 42b. The operating portion 42a is a circular portion. The male threaded portion 42b has a diameter smaller than that of the operating portion 42a. In the present exemplary embodiment, the operating portion 42a has a circular truncated cone shape. The outer peripheral side of the operating portion 42a is disposed away from the attachment/detachment operating portion 34 at a clearance produced for operating the operating portion 42a. The brake knob 42 is disposed inside the knob portion 34a of the attachment/detachment operating portion 34. The male threaded portion 42b is screwed into the female threaded portion 33e of the bearing mounting portion 33. The male threaded portion 42b can make contact with the first plate 41a.

The brake knob 42 is sealed by a seal member 43 shaped in the form of an O-ring, for instance. Further, the brake knob 42 is braked by the seal member 43 in its rotational operation. The seal member 43 is disposed between the brake knob 42 and the bearing mounting portion 33. The structure prevents the rotary position of the brake knob 42 from being easily changed in operating the brake knob 42.

Method of Operating Dual-Bearing Reel

The clutch yoke 35 is normally pressed inwards (rightwards in FIG. 5). The pinion gear 32 is thereby moved to an engaged position. The clutch-on state is herein produced while the pinion gear 32 and the engaging pin 13a of the spool shaft 16 are meshed. Rotational force from the handle assembly 2 is herein transmitted to the spool 12 through the handle shaft 30, the driving gear 31, the pinion gear 32 and the spool shaft 16. The spool 12 is accordingly rotated in the fishing-line winding direction.

In fishing, braking force is regulated by the casting control mechanism 22 for inhibiting occurrence of backlash. In regulating braking force with the casting control mechanism 22, the brake knob 42 is rotated in the clockwise direction, for instance. The brake knob 42 thereby proceeds rightwards in FIG. 5 and the interval between the first plate 41a and the second plate 41b is reduced. Accordingly, braking force onto the spool shaft 16 is increased. By contrast, braking force is reduced by rotating the brake knob 42 in the counterclockwise direction.

When regulation of braking force is finished, the clutch operating member 17 is pressed downwards. The clutch operating member 17 is herein moved to a downward disengaged position. Further, the clutch yoke 35 is moved outwards in conjunction with movement of the clutch operating member 17. The pinion gear 32, which is engaged with the clutch yoke 35, is also moved in the same direction as the clutch yoke 35. As a result, engagement between the pinion gear 32 and the engaging pin 13a of the spool shaft 16 is released and the clutch-off state is thereby produced. In the clutch-off state, rotation from the handle shaft 30 is not transmitted to the spool 12 and the spool shaft 16. Therefore, the spool 12 can be freely rotated. When the clutch-off state is thus produced, an angler drops the fishing line by tilting the reel for arranging the spool shaft 16 along a vertical plane while thumbing the fishing line wound about the spool 12 by the thumb of the hand holding and palming the first cover 6a. The spool 12 is accordingly rotated in the fishing-line releasing direction by the weight of a terminal tackle and the fishing line is reeled out.

When the terminal tackle herein reaches the sea floor and the fishing line slacks, an operation for rotating the handle arm 2a in the fishing-line winding direction is executed for eliminating slack of the fishing line. In executing the operation, an angler extends his/her finger (e.g., the middle finger) of the hand that holds the fishing rod while grabbing and palming the first cover 6a. Then, either any one of the protruding portions 14c or any one of the arm portions 14b, which are disposed on the handle arm 2a, are pressed with the extended middle finger in the fishing-line winding direction. Accordingly, the handle arm 2a is rotated in the fishing-line winding direction and the fishing line can be wound about the spool 12. As a result, slack of the fishing line can be eliminated. Therefore, the fishing line can be wound about the spool 12 without operating the handle knobs 2b of the handle arm 2a.

Further, when the spool 12 is taken out of the reel unit 1, the first cover 6a is detached from the first side plate 5a by operating the attachment/detachment operating portion 34. When the attachment/detachment operating portion 34 is herein rotated from the attachment position depicted with a solid line in FIG. 6 to the detachment position depicted with a dashed two-dotted line in FIG. 6 while the knob portion 34a is pinched, engagement with the frame 5 using the bayonet mechanism 23 is released and the first cover 6a can be thereby removed. Accordingly, the spool 12 can be taken out through the opening 5d.

When being attached, the spool 12 is inserted into the inside of the frame 5 through the opening 5d. Then, the first cover 6a is attached to the first side plate 5a, and the attachment/detachment operating portion 34 is rotated from the detachment position to the attachment position while the knob portion 34a is pinched. It is herein possible to recognize that the attachment/detachment operating portion 34 is disposed in the attachment position by touching the stepped portion 6f formed on the first cover 6a Second Exemplary Embodiment In the following explanation of a second exemplary embodiment and thereafter, structures and actions of elements similar to those of the first exemplary embodiment will be omitted.

Figure 8:
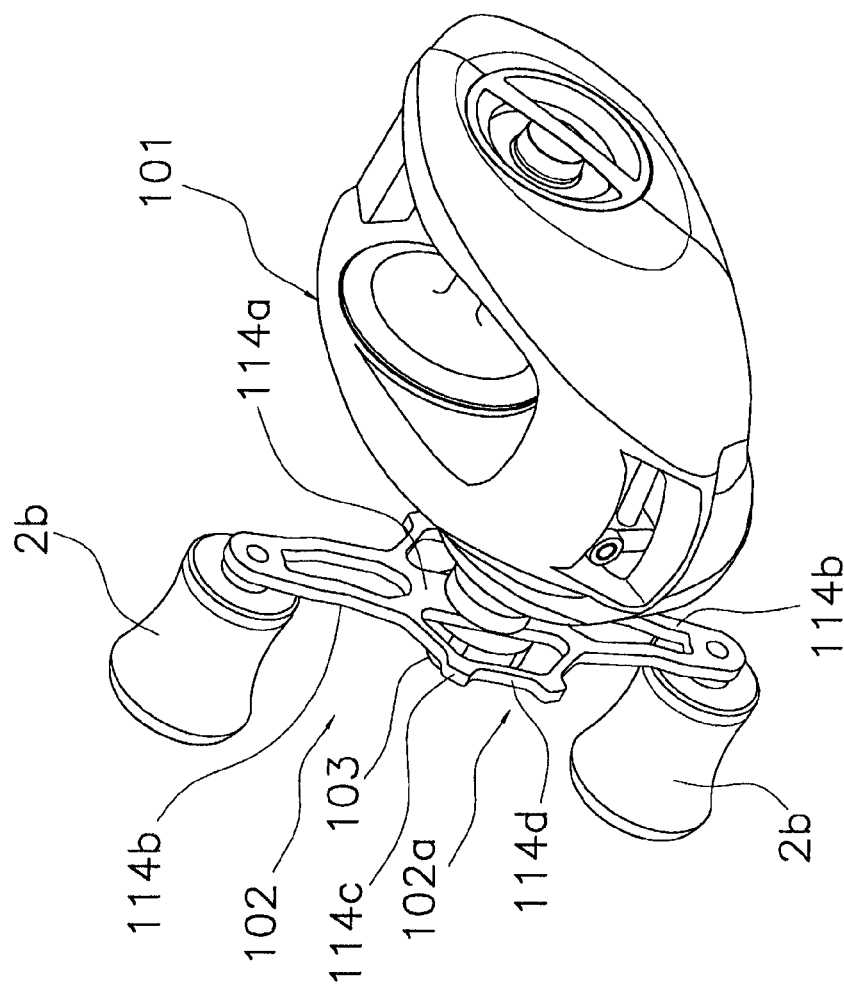
FIG. 8 is a diagram corresponding to FIG. 1 for illustrating a second exemplary embodiment of the present invention.
Figure 9:
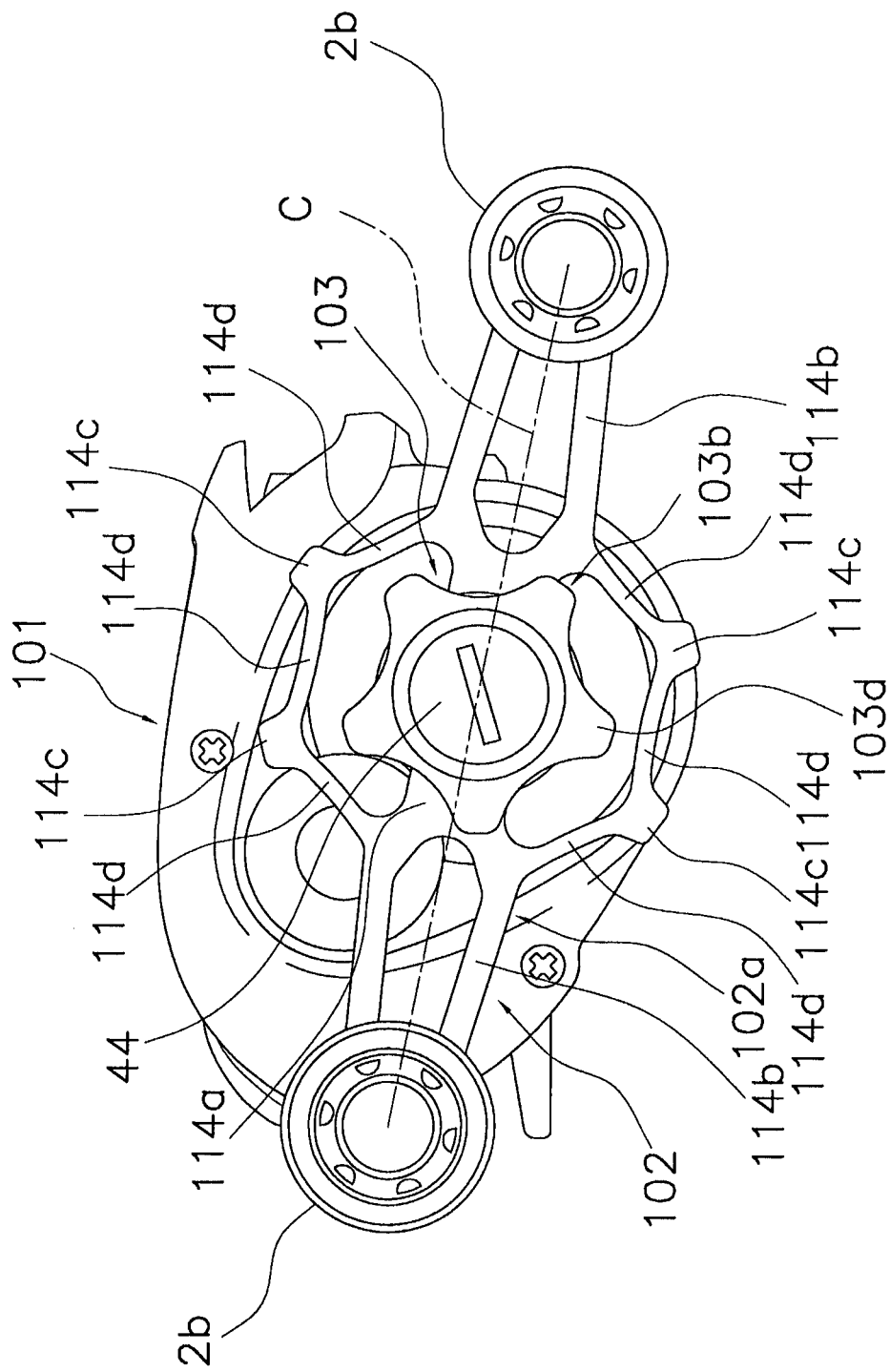
FIG. 9 is a diagram corresponding to FIG. 6 for illustrating the second exemplary embodiment of the present invention.

In FIGS. 8 and 9, a handle arm 102a of a handle assembly 102 includes an attachment portion 114a, two arm portions 114b, protruding portions 114c and coupling portions 114d. The attachment portion 114a and the arm portions 114b are formed in the same shapes as corresponding elements in the first exemplary embodiment, whereas the protruding portions 114c and the coupling portions 114d are formed in different shapes from corresponding elements in the first exemplary embodiment. The handle arm 102a is symmetrically formed through a line C connecting the rotary centers of the handle knobs 2b. The attachment portion 114a is disposed between a drag regulation member 103 and a reel unit 101. Each protruding portion 114c is disposed on one of the corners of a polygon. The protruding portions 114c can protrude radially outwards from the fishing-rod attachment side of the reel unit 101. In the second exemplary embodiment, the protruding portions 114c are disposed on four corners of a hexagon and protrude in a trapezoidal shape. The coupling portions 114d are disposed along the sides of the polygon for connecting the corners.

Further, an operating member 103b of the drag regulation member 103 has five operating protrusions 103d. Structures of the other elements are similarly to those of corresponding elements in the first exemplary embodiment, and explanation thereof will be hereinafter omitted.

Figure 10:
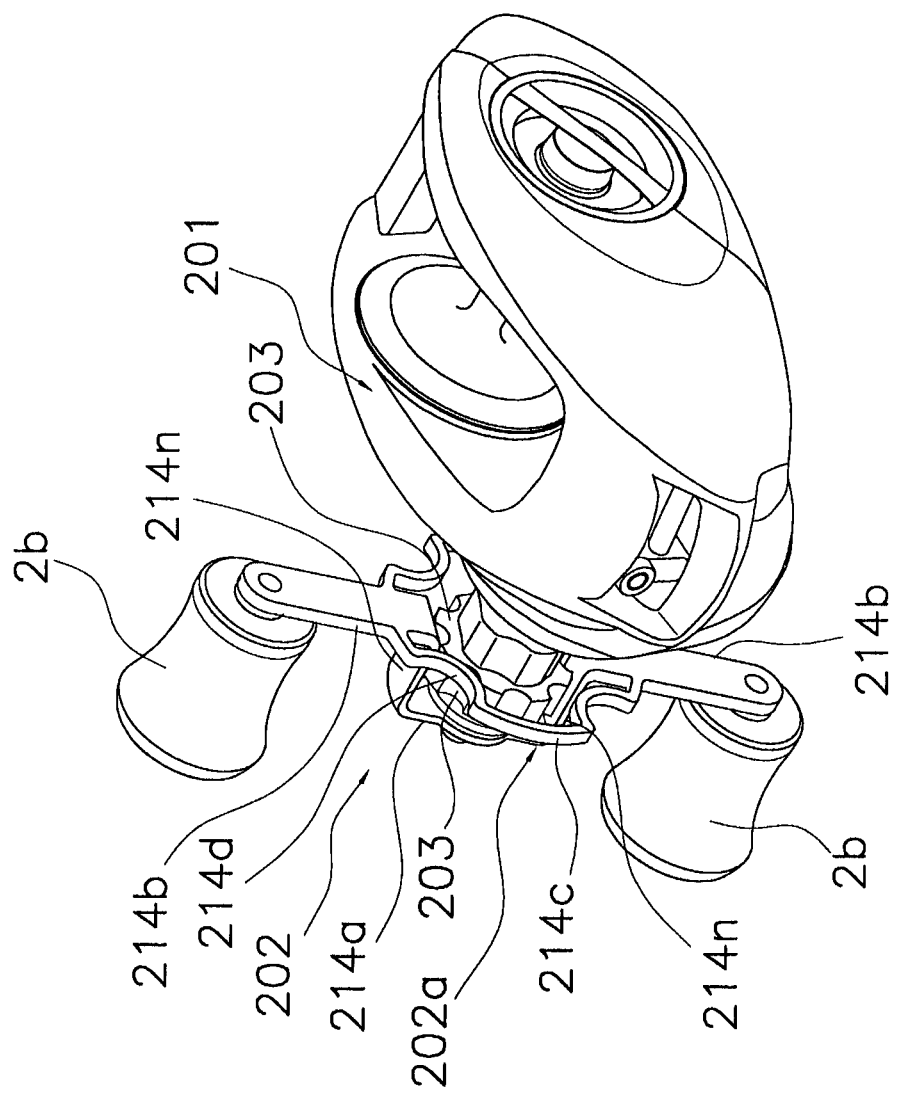
FIG. 10 is a diagram corresponding to FIG. 1 for illustrating a third exemplary embodiment of the present invention.
Figure 11:
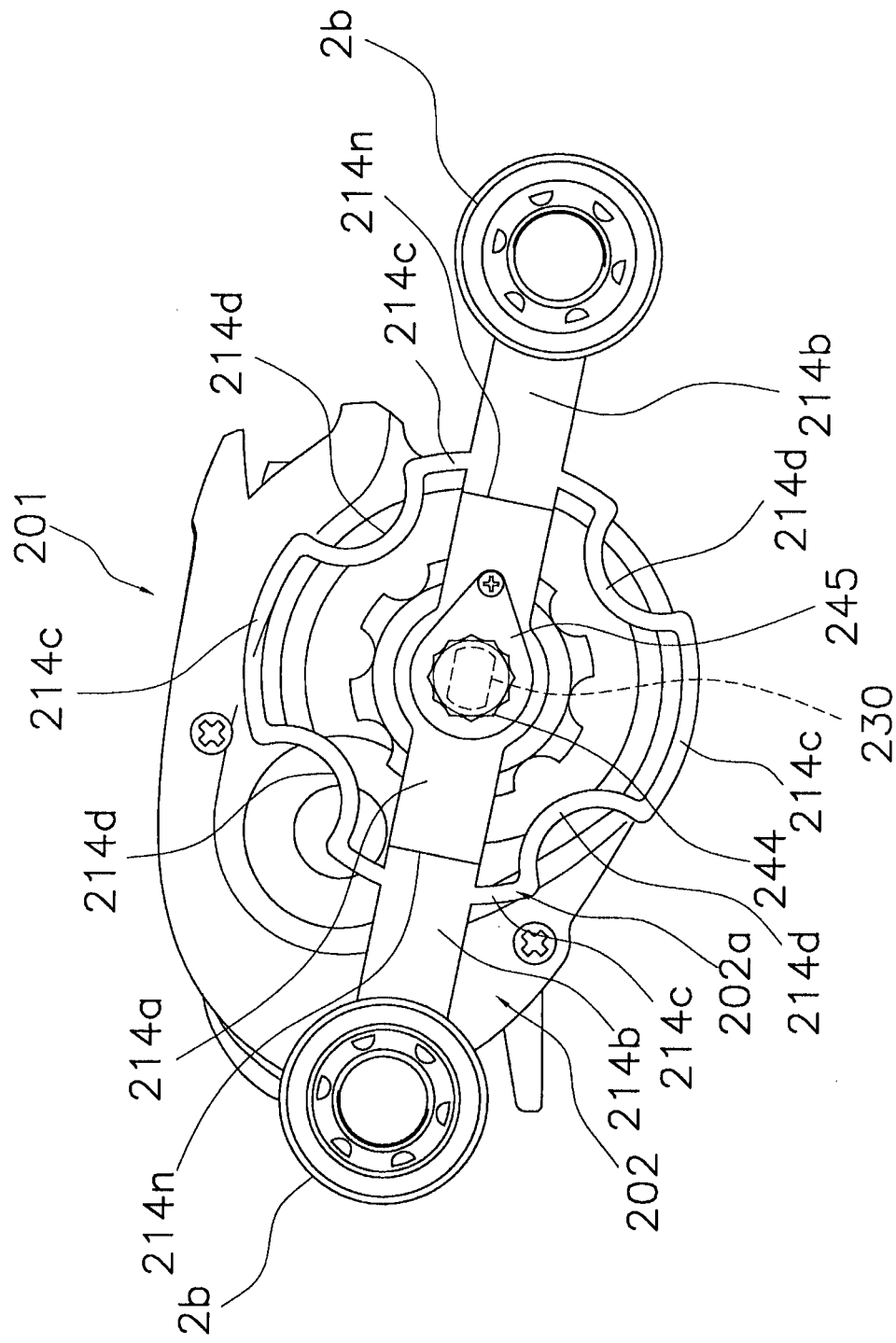
FIG. 11 is a diagram corresponding to FIG. 6 for illustrating the third exemplary embodiment of the present invention.

The second exemplary embodiment configured as described above can also achieve advantageous effects similar to those achieved by the first exemplary embodiment Third Exemplary Embodiment In the first and second exemplary embodiments, the attachment portion of the handle arm is disposed between the drag regulation member and the reel unit. hi a third exemplary embodiment, a drag regulation member 203 is disposed between an attachment portion 214a of a handle arm 202a and a reel unit 201 as illustrated in FIGS. 10 and 11. Therefore, the attachment portion 214a can be attached to a handle shaft 230 while being disposed further away from the reel unit 201 than the drag regulation member 203 is. Further, two arm portions 214b, protruding portions 214c, and coupling portions 214d can be disposed closer to the reel unit 201 than the drag regulation member 203 is. Therefore, both end portions 214n of the attachment portion 214a, which are connected to the two arm portions 214b, are bent towards the reel unit 201 while being disposed radially outwards of the drag regulation member 203. The bent angle preferably falls in a range of 60 to 100 degrees. In the third exemplary embodiment, the bent angle is set to be 90 degrees. The attachment portion 214a is engaged with the handle shaft 230 while being unitarily rotatable therewith. The attachment portion 214a is fixed to the handle shaft 230 by a fixation nut 244 screwed onto the outer peripheral surface of the tip of the handle shaft 230 while being unitarily rotatable therewith. The fixation nut 244 is a cap nut and is prevented from rotating by a retainer 245.

For example, the number of the protruding portions 214c is four. The protruding portions 214c are formed in a circular-arc shape while being concentric to the handle shaft 230. The protruding portions 214c can protrude radially outwards from the fishing-rod attachment side of the reel unit 201. For example, the number of the coupling portions 214d is four. Each coupling portion 214d is formed in a circular-arc shape while the center part thereof is curved for getting closer to the attachment portion 214a. Spaces are produced between the attachment portion 214a and both of the protruding portions 214c and the coupling portions 214d. In the third exemplary embodiment, the protruding portions 214c and the coupling portions 214d are therefore shaped in the form of a line with the equal width.

The third exemplary embodiment configured as described above can also achieve advantageous effects similar to those achieved by the first and second exemplary embodiments.

Features

The aforementioned exemplary embodiments can be expressed as follows. It should be noted in the following explanation that in mentioning an element commonly used in plural exemplary embodiments, the corresponding reference numeral of the first exemplary embodiment is only described without describing the corresponding reference numerals of the other exemplary embodiments.

(A) The handle assembly 2 of a dual-bearing reel can be mounted to the handle shaft 30 rotatably supported by the reel unit 1 of the dual-bearing reel attachable to a fishing rod. The handle assembly 2 includes the handle arm 2a and the handle knobs 2b. The handle arm 2a has the attachment portion 14a, at least one arm portion 14b, the plural protruding portions 14c, and the plural coupling portions 14d. The attachment portion 14a can be attached to the handle shaft 30. At least one arm portion 14b extend radially outwards from the attachment portion 14a. The plural protruding portions 14c are disposed in the surrounding of the attachment portion 14a. The plural protruding portions 14c protrude radially outwards while being circumferentially aligned at predetermined intervals. The plural coupling portions 14d couple the plural protruding portions 14c. The handle knobs 2b are rotatably attached to the tips of the arm portions 14b.

In the handle assembly 2, the plural protruding portions 14c, which are coupled by the coupling portions 14d, are disposed in the surrounding of the attachment portion 14a. Simultaneously, the plural protruding portions 14c protrude radially outwards while being circumferentially aligned at predetermined intervals. With the structure, either the plural protruding portions 14c or at least one arm portion 14b can be operated with a hand opposite to the hand operating the handle assembly 2. In other words, the number of operable portions is increased. Therefore, it is possible to reliably rotate the handle shaft 30 instantly in the fishing-line winding direction with the hand opposite to the hand operating the handle assembly 2.

(B) In the handle assembly 2, the second openings 14$k$ are formed as spaces between the attachment portion 14$a$ and both of the protruding portions 14$c$ and the coupling portions 14$d$. In this case, the handle arm 2$a$ is formed in a minimal shape while weight increase thereof is inhibited. Accordingly, it is possible to reliably rotate the handle shaft 30 instantly in the fishing-line winding direction with the hand opposite to the hand operating the handle assembly 2.

(C) The dual-bearing reel includes the drag mechanism 21 and the drag regulation member 3 for regulating the drag mechanism 21 in the surrounding of the handle shaft 30. Further in the handle assembly 2, the protruding portions 14$c$ can be disposed closer to the reel unit 1 than the drag regulation member 3 is. In this case, it is possible to further easily operate the handle assembly 2 with the hand opposite to the hand operating the handle assembly 2 due to the structure that the protruding portions 14$c$ are disposed closer to the reel unit 1 than the drag regulation member 3 is.

(D) In the handle assembly 2, the attachment portion 14$a$ can be attached to the handle shaft 30 while being disposed closer to the reel unit 1 than the drag regulation member 3 is. In this case, the handle arm 2$a$ is entirely disposed closer to the reel unit 1 than the drag regulation member 3 is. Therefore, the handle arm 2$a$ can be simply formed. Further, distance is reduced between the handle arm 2$a$ and the reel unit 1. This makes it easier to rotate the handle arm 2$a$.

(E) In the handle assembly 202, the attachment portion 214$a$ can be attached to the handle shaft 230 while being disposed away from the reel unit 201 than the drag regulation member 203 is. In this case, even when arrangement of the drag regulation member 203 and the handle assembly 202 are the same as those of a normal dual-bearing reel, it is possible to reliably rotate the handle shall 230 instantly in the fishing-line winding direction with the hand opposite to the hand operating the handle assembly 202.

(F) In the handle assembly 2, the protruding portions 14$c$ can protrude radially outwards from the fishing-rod attachment side of the reel unit 1. In this case, it is possible to easily rotate the handle shaft 30 in the fishing-line winding direction only by extending a finger of the hand opposite to the hand operating the handle assembly 2 due to the structure that the protruding portions 14$c$ protrude radially outwards from the fishing-rod attachment side of the reel unit 1.

(G) In the handle assembly 2, the number of the arm portions 14$b$ is two, and the arm portions 14$b$ extend radially outwards from the attachment portion 14$a$ in opposite directions. In this case, the number of portions operable with the hand opposite to the hand operating the handle assembly 2 is further increased due to the two arm portions 14$b$ herein provided. Therefore, it is possible to further reliably rotate the handle shaft 30 instantly in the fishing-line winding direction.

(H) In the handle assembly 2, the protruding portions 14$c$ are coupled by the coupling portions 14$d$ and are thereby formed in a saw-tooth shape. In this case, it is possible to extend the radial operating length of the protruding portions 14$c$ to be used in winding the fishing line. Therefore, a rotational operation can be further easily executed in the fishing-line winding direction with the hand opposite to the hand operating the handle assembly 2. Further, no radial step is formed between each portion 14$n$ (i.e., gentle slope in the saw teeth) and each protruding portion 14$c$ and between each portion 14$b$ and each coupling portion 14$d$. Therefore, it becomes easy to execute an action of putting a finger from one protruding portion 14$c$ to another protruding portion 14$c$ in operating the handle assembly 2.

(I) In the handle assembly 102, the coupling portions 114$d$ are either linear portions or curved portions disposed along the sides of a polygon. In this case, the coupling portions 114$d$ can be simply formed. It is thereby possible to provide a handle assembly compatibly used for a right handled dual-bearing reel and a left handled dual-bearing reel.

(J) In the handle assembly 202, the coupling portions 214$d$ are disposed in a circular-arc shape while the center part of each coupling portion 214$d$ is disposed closer to the attachment portion 214$a$. In this case, the protruding portions 214$c$ are coupled by the recessed circular-arc shaped coupling portions 214$d$. Therefore, it is possible to provide a handle assembly compatibly used for a right handled dual-bearing reel and a left handled dual-bearing reel.

(K) The dual-bearing reel includes the handle assembly 2 described in one of the aforementioned features (A) to (J). In this case, the dual-bearing reel can achieve advantageous effects similar to those achieved by one of the aforementioned features (A) to (J).

Other Exemplary Embodiment

An exemplary embodiment of the present invention has been described above. However, the present invention is not limited to the aforementioned exemplary embodiment, and a variety of changes can be herein made without departing from the scope of the present invention. Especially, a plurality of embodiments and modifications, described in the present specification, can be arbitrarily combined on an as-needed basis.

(a) In the aforementioned exemplary embodiments, a manual dual-bearing reel has been exemplified. However, the present invention can be applied to an electric dual-bearing reel. Further, the present invention can be applied to a dual-bearing reel with a handle configured to be rotated in the fishing-line releasing direction. Furthermore, the right handled dual-bearing reel has been exemplified. However, the present invention can be also applied to a left handled dual-bearing reel.

(b) In the aforementioned three exemplary embodiments, the protruding portions can protrude radially outwards from the fishing-rod attachment side of the reel unit. However, the protruding portions can be configured not to protrude.

(c) In the aforementioned exemplary embodiments, the double-handle type handle assembly, including the handle aim with two arm portions, has been exemplified for explaining the present invention. However, the present invention can be also applied to a single-handle type handle assembly with a single arm portion.

(d) In the aforementioned exemplary embodiments, the dual-bearing reel including star-drag type drag mechanism has been exemplified for explaining the present invention. However, the present invention can be also applied to a dual-bearing reel including a lever-drag type drag mechanism.

(e) In the aforementioned three exemplary embodiments, spaces are produced by forming openings between the attachment portion and both of the protruding portions and the coupling portions in order to reduce the weight of the handle assembly. However, it is not required to produce such spaces.

Advantageous Effects of the Invention

Overall, according to the present invention, the protruding portions, coupled by the coupling portions, are disposed in the surrounding of the attachment portion. Simultaneously, the protruding portions protrude radially outwards while being circumferentially aligned at predetermined intervals. Therefore, the handle assembly can be operated across a fishing rod even with a hand opposite to the hand operating the handle assembly. As a result, the handle shaft can be reliably rotated in the fishing-line winding direction with the hand opposite to the hand operating the handle assembly.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel attachable to a fishing rod, comprising:
    a reel unit;
    a handle shaft rotatably supported by the reel unit; and
    a handle assembly being mounted onto the handle shaft, the handle assembly including
        a handle arm including
            an attachment portion detachably attached onto the handle shaft in a unitarily rotatable state,
            a first arm portion extending radially outwards from the attachment portion so as to define a plane,
            first and second protruding portions disposed around of the attachment portion, the first and second protruding portions protruding radially outwards so as to be in the plane defined by the first arm portion, the first and second protruding portions circumferentially aligned with each other at predetermined intervals, and
        a coupling portion coupling the protruding portions, and
    a handle knob rotatably attached to a tip of the first arm portion.

2. The dual-bearing reel according to claim 1, wherein a space is arranged between the attachment portion and the first protruding portion, between the attachment portion and the second protruding portion, and between the attachment portion and the coupling portion.

3. The dual-bearing reel according to claim 1, further comprising
    a drag mechanism; and
    a drag regulation member configured adjacent to the handle shaft to regulate the drag mechanism, wherein the first and second protruding portions are disposed closer to the reel unit than the drag regulation member is.

4. The dual-bearing reel according to claim 3, wherein the attachment portion is disposed closer to the reel unit than the drag regulation member is.

5. The dual-bearing reel according to claim 3, wherein the attachment portion is disposed further away from the reel unit than the drag regulation member is.

6. The dual-bearing reel according to claim 1, wherein the first and second protruding portions protrude radially outwards from a fishing rod attachment side of the reel unit.

7. The dual-bearing reel according to claim 1, wherein the handle arm include a second arm portion extending radially outwards from the attachment portion, and the first and second arm portions extend radially outwards from the attachment portion in opposite directions.

8. The dual-bearing reel according to claim 1, wherein the first and second coupling portions form a part of a polygon.

9. The dual-bearing reel according to claim 1, wherein the first coupling portion has a circular-arc shape and a center part thereof is disposed adjacent to the attachment portion.

10. A dual-bearing reel attachable to a fishing rod, comprising:
    a reel unit;
    a handle shaft rotatably supported by the reel unit; and
    a handle assembly being mounted onto the handle shaft, the handle assembly including
        a handle arm including
            an attachment portion detachably attached onto the handle shaft in a unitarily rotatable state,
            a first arm portion extending radially outwards from the attachment portion,
            first and second protruding portions disposed around of the attachment portion, the first and second protruding portions protruding radially outwards, the first and second protruding portions circumferentially aligned with each other at predetermined intervals, and being coupled in a saw-tooth shape by the coupling portions,
        a coupling portion coupling the protruding portions, and
        a handle knob rotatably attached to a tip of the first arm portion.

11. A handle assembly for a dual-bearing reel, the handle assembly mountable onto a handle shaft rotatably supported by a reel unit of the dual-bearing reel attachable to a fishing rod, the handle assembly comprising:
    a handle arm including
        an attachment portion detachably attached onto the handle shaft in a unitarily rotatable state,
        an arm portion extending radially outwards from the attachment portion so as to define a plane,
        first and second protruding portions disposed around of the attachment portion, the first and second protruding portions protruding radially outwards so as to be in the plane defined by the arm portion, the first and second protruding portions circumferentially aligned with each other at predetermined intervals, and
    a coupling portion coupling the protruding portions; and
    a handle knob rotatably attached to a tip of the arm portion.

* * * * *